(12) United States Patent
Burkhart

(10) Patent No.: US 8,011,094 B2
(45) Date of Patent: *Sep. 6, 2011

(54) METHOD OF CONVERTING DIESEL ENGINE TO NATURAL GAS ENGINE

(75) Inventor: James H. Burkhart, McKinney, TX (US)

(73) Assignee: Emission Solutions, Inc., McKinney, TX (US)

(*) Notice: Subject to any disclaimer, the term of this patent is extended or adjusted under 35 U.S.C. 154(b) by 989 days.

This patent is subject to a terminal disclaimer.

(21) Appl. No.: 11/167,022

(22) Filed: Jun. 24, 2005

(65) Prior Publication Data

US 2005/0251999 A1 Nov. 17, 2005

Related U.S. Application Data

(63) Continuation-in-part of application No. 10/274,672, filed on Oct. 21, 2002, now Pat. No. 6,910,269.

(60) Provisional application No. 60/343,853, filed on Oct. 19, 2001, provisional application No. 60/343,933, filed on Oct. 19, 2001, provisional application No. 60/343,925, filed on Oct. 19, 2001, provisional application No. 60/343,931, filed on Oct. 19, 2001, provisional application No. 60/343,930, filed on Oct. 19, 2001.

(51) Int. Cl.
*B21K 21/16* (2006.01)
*B21K 3/00* (2006.01)
*F02B 3/06* (2006.01)

(52) U.S. Cl. .......... 29/888.011; 29/401.1; 29/888.01; 123/27 GE; 123/575

(58) Field of Classification Search .......... 29/401.1, 29/526, 888.01, 888.011; 123/27 GE, 575, 123/590, DIG. 7
See application file for complete search history.

(56) References Cited

U.S. PATENT DOCUMENTS

| | | | | |
|---|---|---|---|---|
| 1,540,180 A | * | 6/1925 | Munroe | 313/141 |
| 2,884,908 A | * | 5/1959 | Campbell | 91/270 |
| 3,077,189 A | * | 2/1963 | Earnshaw et. al. | 123/65 BA |
| 3,200,798 A | * | 8/1965 | Mansfield | 123/48 B |
| RE26,145 E | | 1/1967 | Friddell | |
| 3,332,756 A | * | 7/1967 | Deffner | 44/355 |
| 3,542,376 A | * | 11/1970 | Dykehouse | 277/451 |
| 4,137,873 A | * | 2/1979 | Caswell, Sr. | 123/78 B |
| 4,259,840 A | * | 4/1981 | Tenney | 60/602 |
| 4,406,259 A | * | 9/1983 | Van Etten | 123/198 R |
| 4,911,124 A | | 3/1990 | Bennett | |
| 5,315,981 A | | 5/1994 | Chen | |
| 5,664,535 A | * | 9/1997 | Peeters | 123/193.4 |

* cited by examiner

*Primary Examiner* — David Bryant
*Assistant Examiner* — Alexander P Taousakis
(74) *Attorney, Agent, or Firm* — Stinson Morrison Hecker LLP

(57) ABSTRACT

A method of converting a diesel engine to a natural gas engine comprising inserting a spark plug into a diesel fuel injector opening in a cylinder head; installing a throttle body on the diesel engine; installing a throttle body adaptor between a throttle body and an intake manifold of said diesel engine; and modifying a piston, whereby the compression ratio of said piston is decreased during operation of said piston. The method also includes installation of a waste gate and waste gate adaptor and a timing mask.

2 Claims, 7 Drawing Sheets

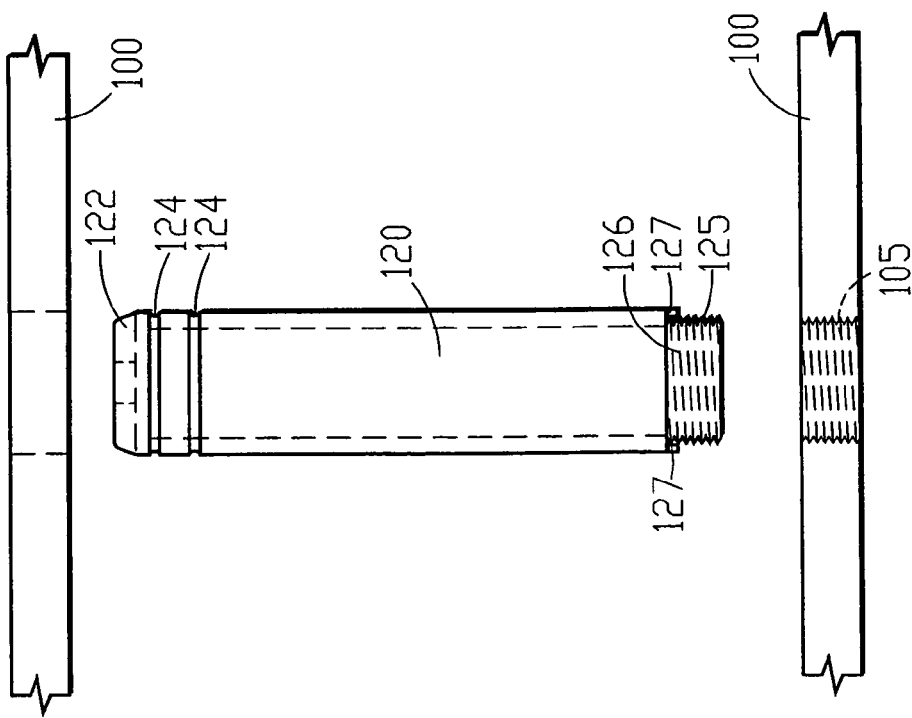
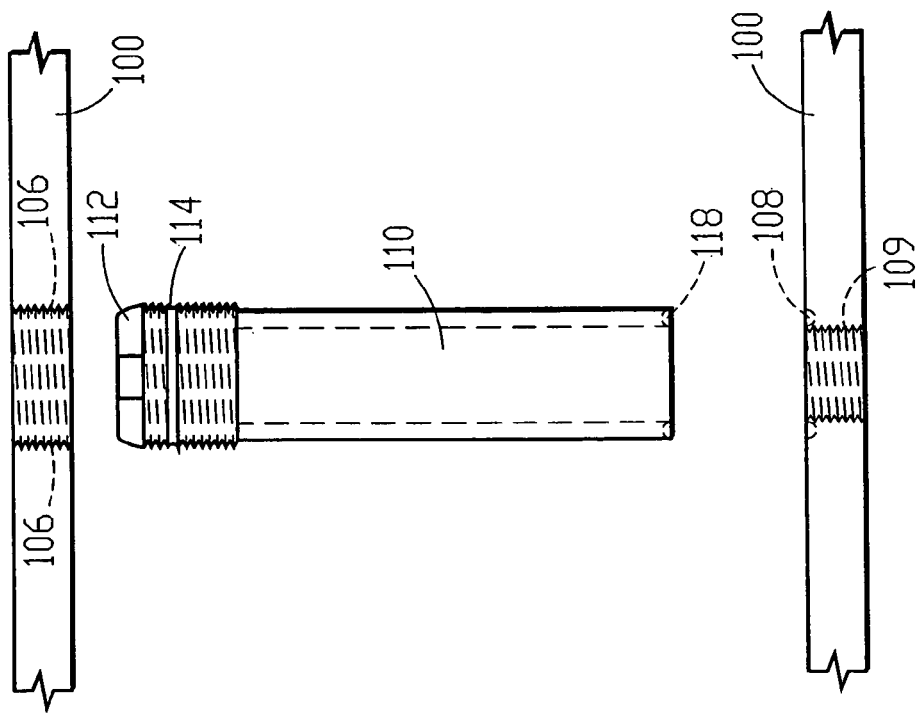

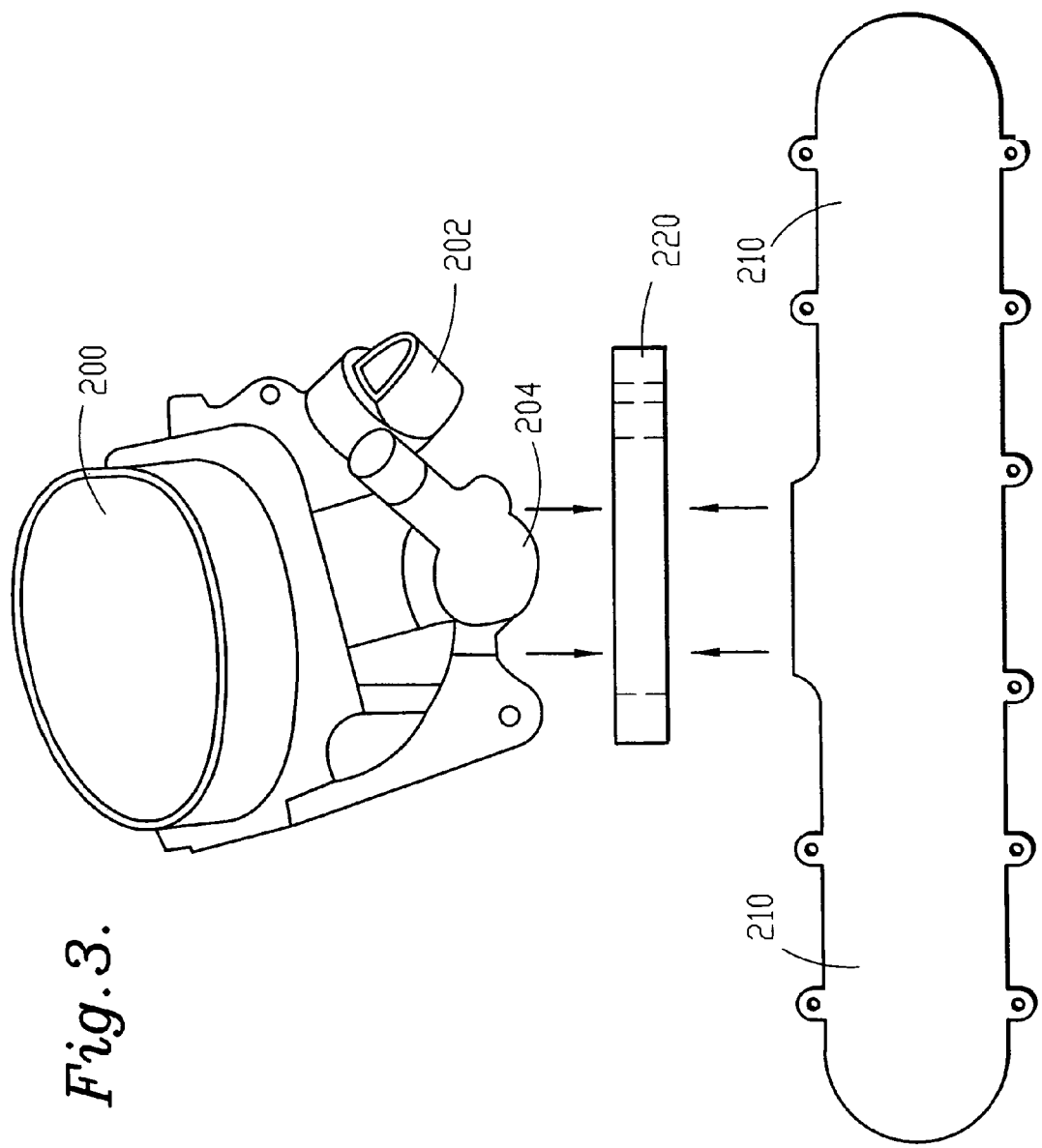

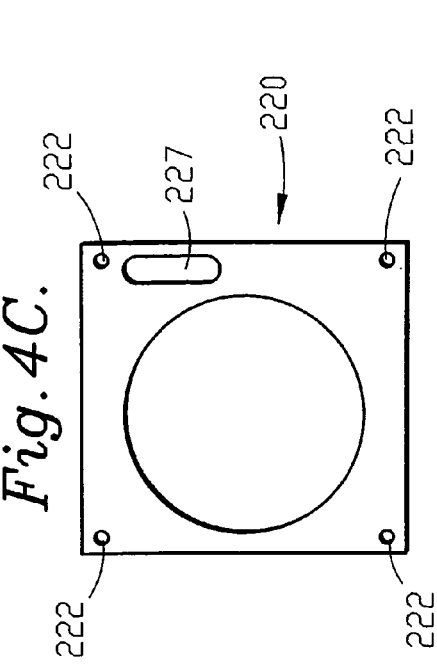
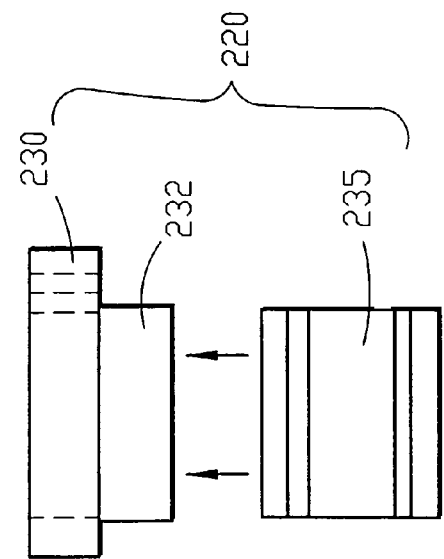
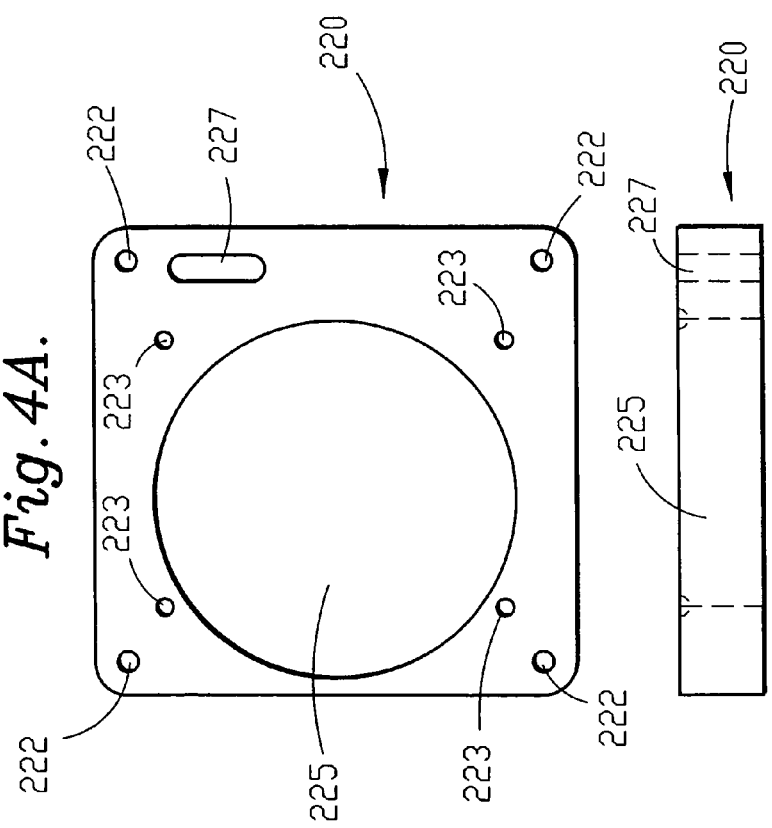

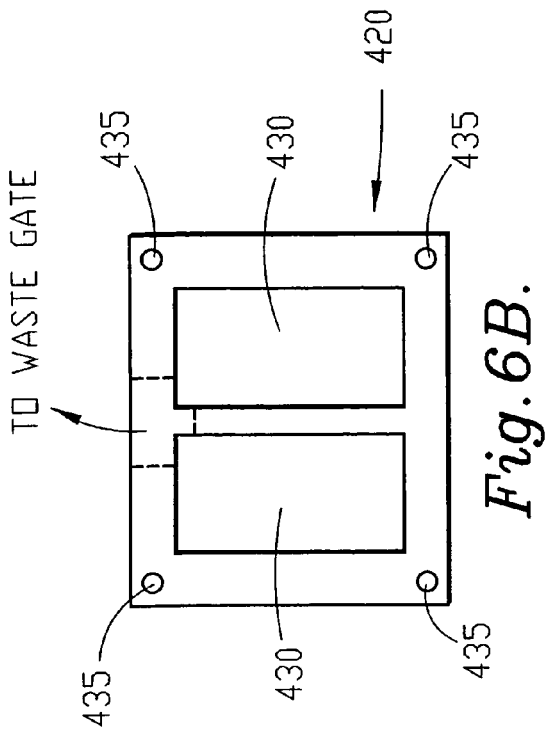
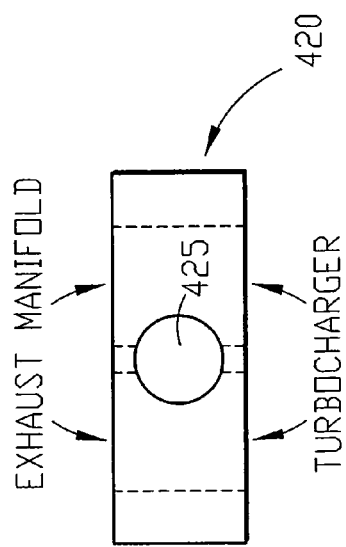
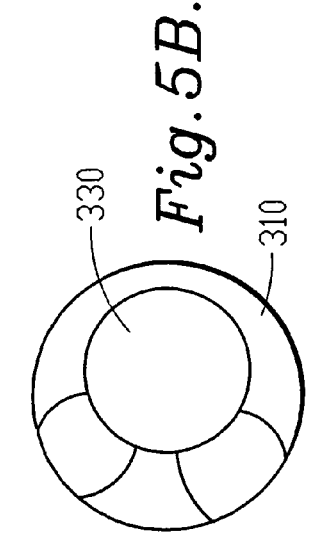
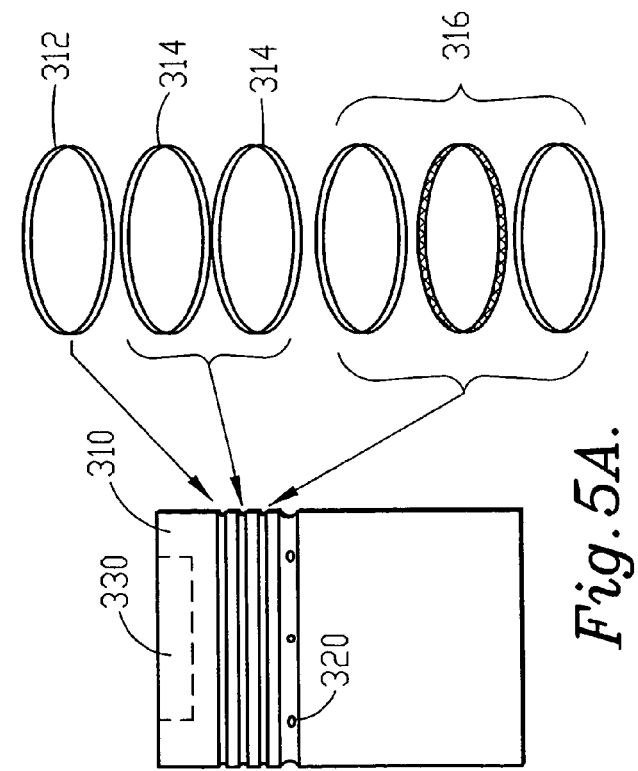

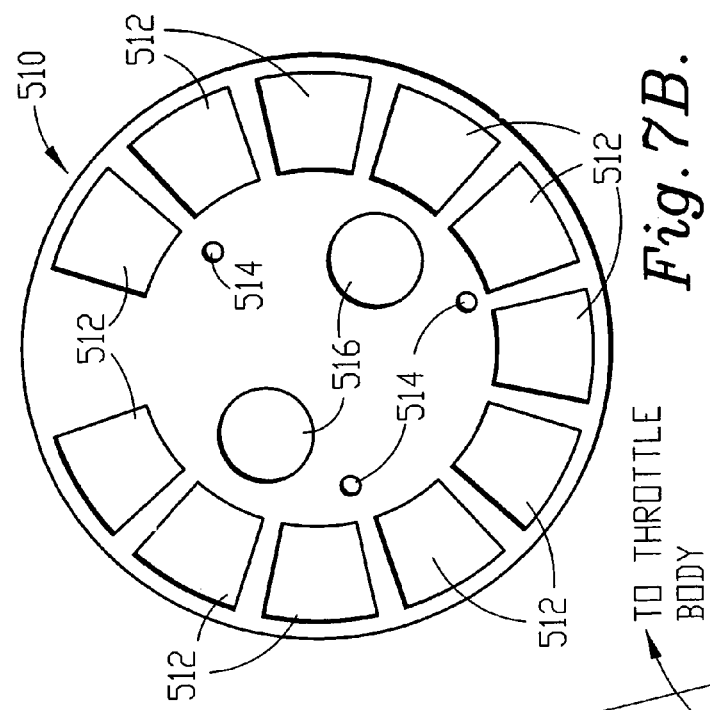
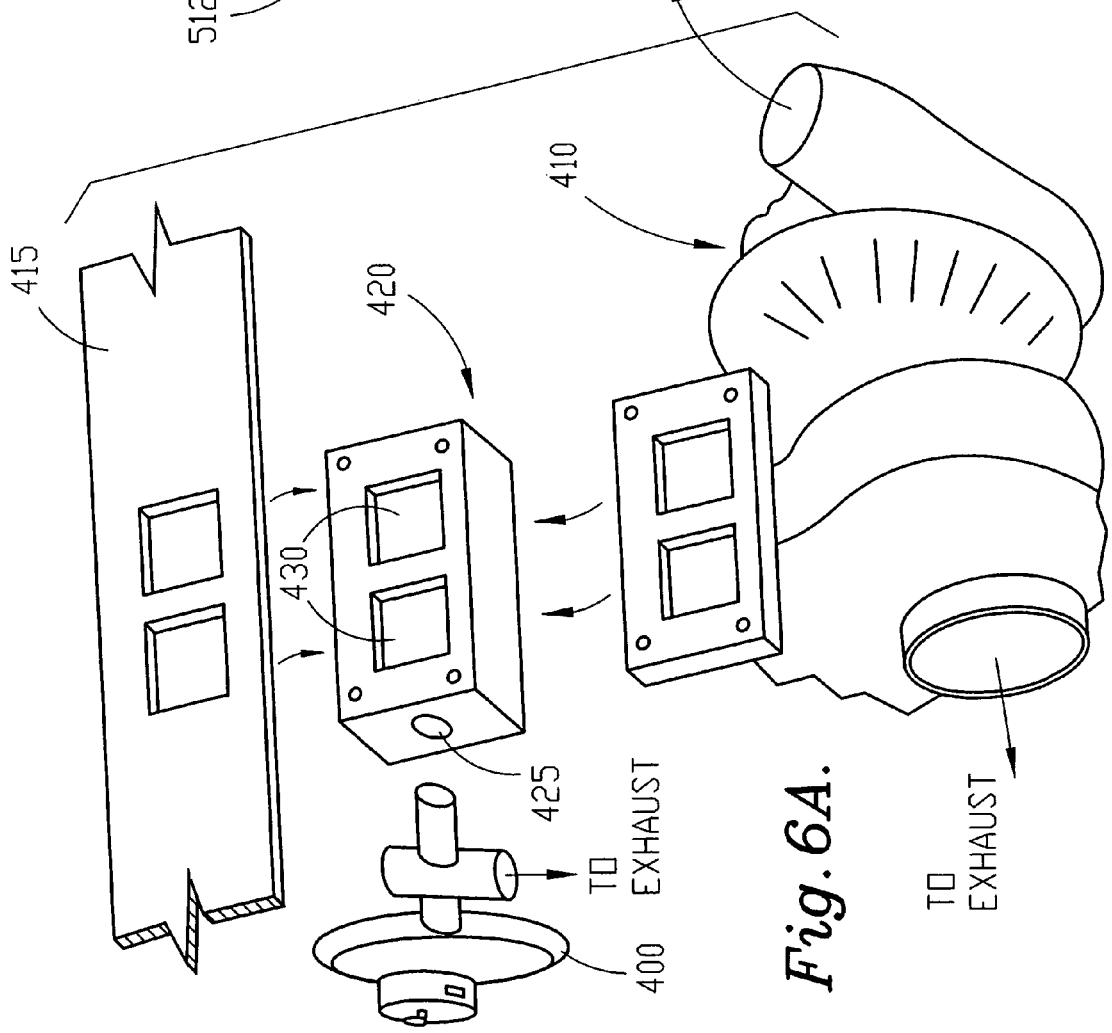
Fig. 7B.
Fig. 6A.

METHOD OF CONVERTING DIESEL ENGINE TO NATURAL GAS ENGINE

CROSS-REFERENCE TO RELATED APPLICATIONS

This application is a continuation in part application of Ser. No. 10/274,672, filed Oct. 21, 2002 now U.S. Pat. No. 6,910,269 which is a continuation-in-part application of (1) U.S. Provisional Application Ser. No. 60/343,853 filed on Oct. 19, 2001 entitled "Method and System for Modifying a Diesel Engine to Run on Natural Gas: Head Modification Patent"; (2) U.S. Provisional Application Ser. No. 60/343,933 filed on Oct. 19, 2001 entitled "Method and System for Modifying a Diesel Engine to Run on Natural Gas: Piston Configuration and Ring Placement Patent"; (3) U.S. Provisional Application Ser. No. 60/343,925 filed on Oct. 19, 2001 entitled "Method and System for Modifying a Diesel Engine to Run on Natural Gas: Waste Gate Adaptor and Exhaust Patent"; (4) U.S. Provisional Application Ser. No. 60/343,931 filed on Oct. 19, 2001 entitled "Method and System for Modifying a Diesel Engine to Run on Natural Gas: Throttle Body Adaptor Patent"; and (5) U.S. Provisional Application Ser. No. 60/343,930 filed on Oct. 19, 2001 entitled "Method and System for Modifying a Diesel Engine to Run on Natural Gas: Timing Mask and Timing Pick Up Patent," all of which are hereby incorporated herein by reference.

STATEMENT REGARDING FEDERALLY SPONSORED RESEARCH OR DEVELOPMENT

Not Applicable.

FIELD OF THE INVENTION

The present invention is directed to converting diesel engines to spark ignited natural gas fueled engines.

BACKGROUND OF THE INVENTION

The conversion of diesel engines into natural gas operation has been an aspiration of the internal combustion engine industry for a period of time. Natural gas, which includes LPG, CNG, LNG, and hydrogen, is a clean burning fuel (relative to diesel) with improved emission levels of both nitrogen oxides ($NO_x$) and particulate matter. Thus, increasing concern over exhaust emissions regulation and fuel efficiency have led to an interest in burning a combustible gaseous mixture, such as propane or natural gas in diesel engines, particularly in diesel engines used in road HD trucks, stationary, marine, and locomotive applications. Thus, a method of converting diesel engines to spark ignited engines that will meet Environmental Protection Agency ("EPA") and California Air Resources Board ("CARB") ultra low emission standards is desired.

A number of strategies have been used for the conversion of diesel engines to spark ignited natural gas engines. Such conversions have included replacing the diesel fuel injectors with spark plugs connected to a suitable ignition system and providing a throttle body on the intake manifold. See Friddell, U.S. Pat. No. Re. 26,145. Another method involves changing the camshaft lobes to change intake and exhaust opening timings so that the compression ratio does not need to be changed. See Chen, U.S. Pat. No. 5,315,981. Another conversion method involves utilizing a rocker and fulcrum mechanism to open the exhaust valves of the engine to degrease the reflux of exhaust gasses into the combustion chamber. See Bennett, U.S. Pat. No. 4,911,124. However, none of these methods has been fully satisfactory in the conversion process.

BRIEF DESCRIPTION OF THE DRAWINGS

FIG. 2A is an exploded side view of a sleeve and cylinder head in accordance with a first embodiment of the present invention.

FIG. 2B is an exploded side view of a sleeve and cylinder head in accordance with a second embodiment of the present invention.

FIG. 3 is an exploded side view showing the location of the throttle body adaptor of the present invention between a throttle body and intake manifold.

FIG. 4A is a top view of a first embodiment of the throttle body adaptor in accordance with the present invention.

FIG. 4B is a side view of a second embodiment of the throttle body adaptor in accordance with the present invention.

FIG. 4C is a top view of a second embodiment of the throttle body adaptor in accordance with the present invention.

FIG. 4D is a side view of a first embodiment of the throttle body adaptor in accordance with the present invention.

FIG. 5A is a side exploded view of a piston and ring assembly in accordance with a the present invention.

FIG. 5B is a top view of a piston in accordance with the present invention showing a portion machined away to achieve a desired compression ratio.

FIG. 6A is an exploded view showing the location of a waste gate adaptor of the present invention between the exhaust manifold and turbocharger.

FIG. 6B is a top view of a waste gate adaptor in accordance with the present invention.

FIG. 6C is a side view of a waste gate adaptor in accordance with the present invention.

FIG. 7B is a front view of a the timing mask in accordance with the present invention.

DESCRIPTION OF THE PREFERRED EMBODIMENT

Those skilled in the art will recognize that the steps needed to convert a diesel engine to an engine utilizing natural gas will depend on the specific type of diesel engine. For example, while a spark plug assembly must be inserted in all diesel engines for conversion, those skilled in the art will recognize that because some diesel engines are manufactured with waste gates, a waste gate adaptor will not be required for conversion. Likewise, because many diesel engines are manufactured with a timing mask, installation of such a device will not be required. For illustrative purposes, the present invention is described with reference to the Navistar 466 Engine (also known as the "old generation" or "legend" engine) and the Navistar 530 and 466E Engines (also known as the "new generation" engines). Thus, the present invention is not intended to be limited to conversion of the specific diesel engines described herein.

A. Spark Plug Assembly

To convert a four-stroke diesel engine to a spark-ignited natural gas engine, the first step involves modifying the cylinder head to accept spark plugs. It will be appreciated by those skilled in the art that in some diesel engines, this modification may involve removing the diesel fuel injector. In other engines, this step may require machining of the diesel injector hole and threading the hole to accept the spark plug. Yet, in other cases, a sleeve for encasing the spark plug may be machined in order to prohibit water from reaching either the spark plug or the piston cylinder.

Figure 1:
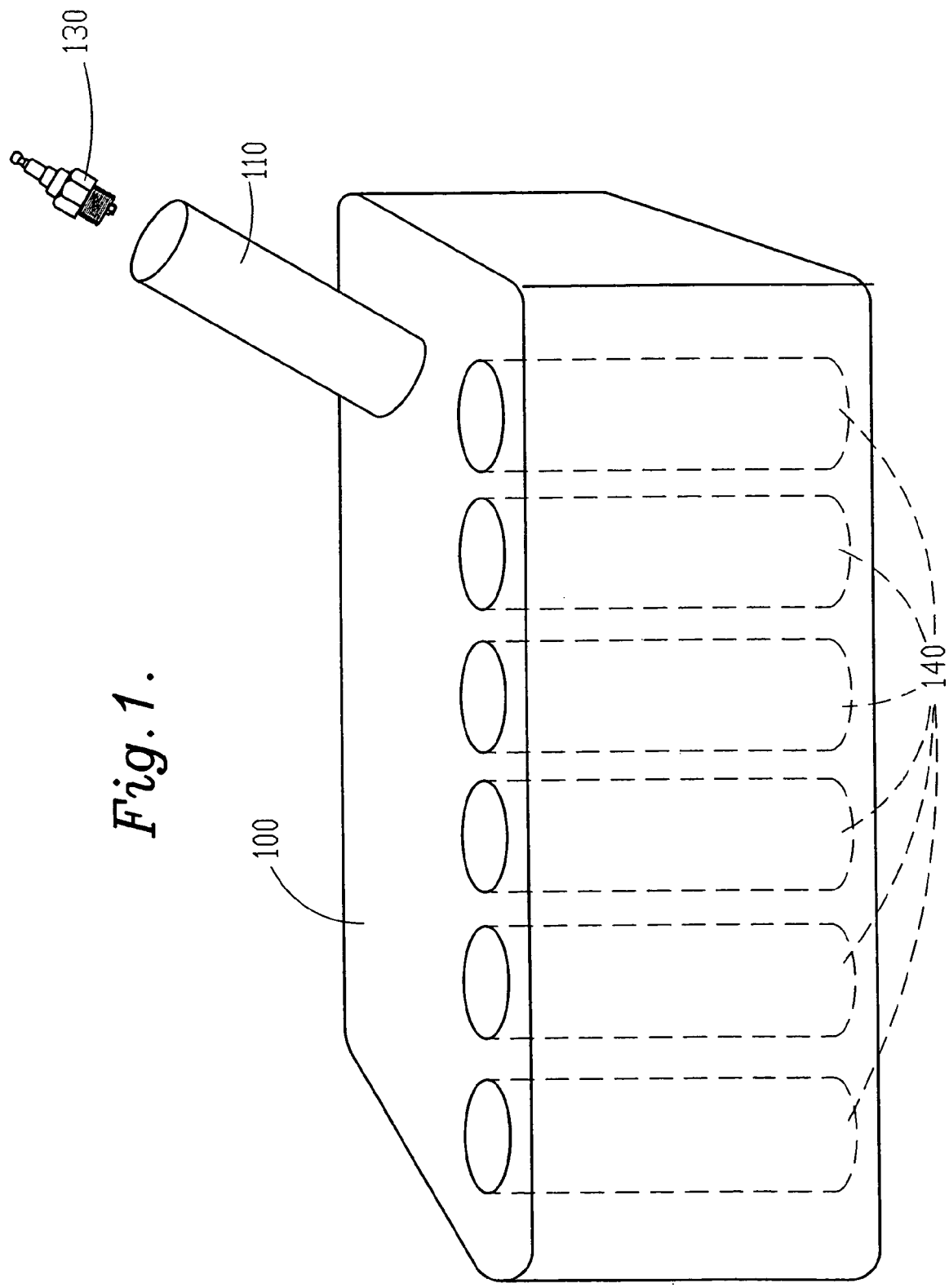
FIG. 1 is an exploded view of the spark plug and sleeve assembly of the present invention being inserted into a cylinder head of a diesel engine.

As illustrated in FIG. 1, the diesel fuel injectors (not shown) have been removed from the cylinder head (100) to create an opening (140) for insertion of a spark plug (130). A sleeve (110) containing a spark plug (130) is inserted into the opening (140), thereby sealing the engine coolant from the spark plug (130) as well as the top and bottom of the cylinder head (100). The sleeve (110) may be comprised of any suitable material, but is preferably comprised of metal, such as steel, brass and the like. The sleeve (110) and/or head (100) may also be machined to receive rubber seals.

FIGS. 2A and 2B show examples of sleeve and spark plug assemblies that can be used in conjunction with either the Navistar 466 or 466E engines. As shown in FIG. 2A, in one embodiment, the sleeve (110) includes an outside hex (112). This hex (112) extends above and outside the head in the fully assembled engine. A groove (114) for receiving an o-ring or similar seal (not shown) and threads (116) for connecting with the top of the head (100) are machined onto the sleeve (110). The sleeve (110) also includes a slot (118) at the bottom which engages another o-ring or seal (not shown).

The top of the cylinder head (100) shown in FIG. 2A is machined with threads (106) that engage the threads (116) of the sleeve (110). In addition, the bottom of the cylinder head (100) is machined with a furrow (108) that will receive the o-ring or seal (not shown). The cylinder head (100) also has threads (109) which engage the spark plug (130). Thus, the spark plug (130) extends through the bottom of the head and into the cylinder (not shown) to ignite the air/fuel mixture.

FIG. 2B shows an alternative embodiment of the spark plug and sleeve assembly used in accordance with the present invention. The sleeve (120) has an inside hex (122) that is extends outside the head (100) so that the hex does not interfere with the valve cover (not shown) mounted on top of the head (100). Two grooves (124) in the top of the sleeve (120) are provided to accept two o-rings (not shown) to create a seal with the top of the head (100). The outside of the bottom of the sleeve (120) is also machined with threads (125) which engage corresponding threads (105) in the cylinder head (100). An annular steel compression seal (127) is utilized to create a positive seal. The inside of the bottom of the sleeve (120) contains threads (126, dashed lines) for engaging the spark plug (130). Thus, in this embodiment, the sleeve (120) can be removed with the plug (130).

As discussed above, in FIG. 2B, the top of the head (100) engages the o-rings (not shown) of the sleeve (120). The bottom of the head (100) is machined with threads (105) that engage the threads (125) on the sleeve (120). When assembled, the sleeve (120) and spark plug (13) extend through the bottom of the head (100).

Due to the extreme heat generated by the burning of natural gas, the intake and exhaust valves, as well as the valve seats, are preferably cryogenically treated such that they are frozen below minus 250° F., and more preferably below minus 350° F. This processes hardens the valves and seats, increasing their ability to withstand heat.

B. Throttle Body Adaptor

In a natural gas engine, a throttle body regulates the flow of air from the atmosphere to an intake manifold that provides an air/fuel mixture to engine combustion chambers. Providing maximum airflow to the combustion chamber enables the engine to reach maximum power. The engine produces a minimum amount of power when airflow is almost entirely restricted, such as when the engine is idling. Of course, airflow must be regulated by the throttle body between maximum and minimum engine power so that the engine may perform under a variety of vehicle operating conditions.

The present invention is intended to utilized with all of the various throttle bodies are known to those skilled in the art. An example of such a throttle body (200) that can be used in accordance with the present invention is that from a GM Chevrolet 454 engine. As discussed above, the throttle body (200) introduces both air and fuel into the intake manifold (210) and the intake valves (not shown). This is accomplished on the intake stroke of the piston when the intake valves are open for the piston in the correct firing order (not shown). The throttle body performs several functions. First, the throttle body is fitted with an idle air control ("IAC") (202) to allow for smooth idle and cold start performance. Second, the throttle body has a throttle position sensor ("TPS") (204) which tells an electronic control unit the position of the throttle plate or butterfly. The throttle plate, which responds to actuation of the accelerator pedal, determines the amount of air/fuel required to run the engine at the desired speed. In general, when the throttle plate is horizontal, it closes the air/fuel mixture, and when opened, the throttle plate becomes increasingly more vertical to allow more air/fuel into the intake manifold to increase speed and power.

In accordance with the present invention, a throttle body adaptor (220) is utilized in order to accommodate placement of a throttle body (200) on the engine. Examples of such throttle body adaptors (220) are shown in FIGS. 4A-D. Each of these throttle body adaptors (220) can be utilized in both the Navistar 466 and 466E engines. The throttle body adaptor (220) can be made of any suitable material, such as aluminum and the like.

As illustrated in FIGS. 4A and 4B, the throttle body adaptor (220) has a large center orifice (225) which is connected to the throttle body (200) and an opening (212) on the intake manifold (210). The throttle body adaptor (220) includes holes (222) for bolting to the throttle body (200). The throttle body adaptor (220) may also have holes (223) for bolting to the intake manifold (210). The throttle body adaptor (220) also contains an air control orifice (227) which is connected to the IAC to allow air to by-pass the throttle plate. Those skilled in the art will recognize that the size, shape, and location of the orifice (225) and the air control orifice (227) will depend upon the throttle body being utilized in the engine.

In an alternative embodiment, as shown in FIGS. 4C and 4D, the throttle body adaptor (220) includes both a body portion (230) having a flange (232) and a rubber hose (235). The body portion (230) of the adaptor is connected to the throttle body (200) with bolts as in FIG. 4A. The rubber hose (235), however, connects the throttle body adaptor (220) to the intake manifold (210).

C. Piston Configuration and Ring Placement

To convert a four-stroke diesel engine to a spark-ignited natural gas engine, the third step involves modifying the piston configuration and ring placement. The closing of the throttle plate creates a tremendous amount of vacuum pressure in the cylinders, which in turn, places a heavy demand on the piston rings to keep oil from escaping past the rings in the piston cylinder. In the event that this oil is not contained, the engine will burn the oil and create large amounts of particulate matter, smoke, and unwanted emissions.

Those skilled in the art also recognize that a diesel ring set is designed to accommodate the very high compression ratios required to accomplish compression ignition, compressing the air/fuel in the cylinder until is causes combustion. Because a diesel engine never creates a vacuum, the diesel ring set is designed to expand out towards the cylinder wall on the compression stroke and to relax on the intake stroke. The present invention utilizes a ring set which allows the conversion of a diesel engine to natural gas.

In accordance with the present invention, a four-ring piston is utilized to accomplish the conversion and prevent unwanted emissions. In one embodiment, as illustrated in FIG. 5A, an IPD ring and piston set (300) is utilized for the Navistar 466 engine. The piston (310) utilizes a top scraper ring (312) (such as an IPD or Federal Mogul Standard Ring), two middle reverse torque rings (314) (such as an IPD Standard Reverse Torque Ring, which has a beveled bottom side), and a bottom three-piece oil ring (316) (i.e., a ring having a metal spacer or expander or central part which is accordion-folded and sandwiched between two flat "rail" rings). During use, the inside bevels on the middle reverse torque rings (314) are reversed so that on an intake stroke, when the pressure is reduced, these rings are expanded out towards the cylinder wall. The top scraper ring, along with the two center reverse torque rings, maintain the compression. The three-piece oil ring corrects problems associated with oil. One or more holes (320) are preferably drilled into the piston for the three-piece oil ring for oil relief. Those skilled in the art will recognizes that holes (320) may not be required in new generation engines.

In another embodiment, a three-ring piston set may be utilized for some engines. The piston utilizes a top scraper ring, only one middle reverse torque ring, and a bottom three-piece oil ring. Such ring assemblies are suitable for Hastings or Federal Mogul pistons.

As discussed above, the diesel compression ratio is typically large, on the order of about 16:1 to 22:1. In order to convert a diesel engine to a natural gas burning engine, the ratio is lowered to about 9:1 to 12:1, and preferably between 10:1 to 11:1 and even more preferably to 10.5:1. As illustrated in FIG. 5B, for example, the new compression ratio is achieved by removing a calculated amount of material from the top of the piston (320) on the Navistar "legend" 466 engine. The material is preferably removed to form a "dish" or concave top (330) as illustrated in drawing.

Those skilled in the art will recognize that varying amounts of material may need to be removed to obtain the desired compression ratio depending on the type of engine. Likewise, the exact amount of material will depend on the bore and stroke of the particular engine being converted. In addition, the location of the concave portion may vary. As illustrated in the Navistar new generation 466E engine in FIG. 6B, the "dish" or concave portion (360) is preferably not centered in the piston to permit a more complete burning of the fuel.

D. Waste Gate Adaptor

Another aspect of the present invention's method of converting a diesel engine to a natural gas engine involves installation of a waste gate in front of the turbocharger. While many modern diesel engines are equipped with a waste gate, many older models do not have such a device. A turbocharger consists of a turbine which drives a compressor to charge or force more air into the engine's inlet manifold. The turbine is driven by exhaust gases from the exhaust manifold. The waste gate controls the amount of boost, or compressed air, from the turbocharger into the throttle body and into the intake manifold and individual inlet passages of the cylinder head to the intake valves. In general, the waste gate limits the boost in a turbocharger via a valve. The waste gate bypasses the exhaust under certain conditions. Without a waste gate, a turbocharger will destroy an engine by over boosting the intake charge.

An example of a diesel engine which has no waste gate is the Navistar 466 engine. As illustrated in FIG. 6A, a waste gate adaptor (420) is used to attach the waste gate (400) (such as waste gate manufactured by Turbonetics) between the turbocharger (410) and the exhaust manifold (415). Exhaust from the engine travels through the adaptor into the turbocharger. The waste gate adaptor may be machined from any suitable material, such as steel.

As shown in FIG. 6B, the waste gate adaptor (420) includes an top orifice (425) for connection to the waste gate (400). The size, shape and location of the orifice (425) will depend on the type of waste gate (400) being installed. The adaptor (420) also contains two holes (430) which are aligned with the exhaust manifold (415) and turbocharger (410). The size, shape and location of the holes (430) will depend on the type of waste gate (400) being installed. That is, the waste gate adaptor reflects the same hole design as the exhaust manifold and turbocharger.

E. Timing Mask

The present invention also involves modification of the camshaft gear to accommodate a timing mask in some diesel engines. While many modern diesel engines are equipped with a timing mask, many older models do not have such a device. For example, while the Navistar 466E new generation engine has a timing mask, the Navistar 466 old generation engine is not equipped with a timing mask.

Figure 7A:
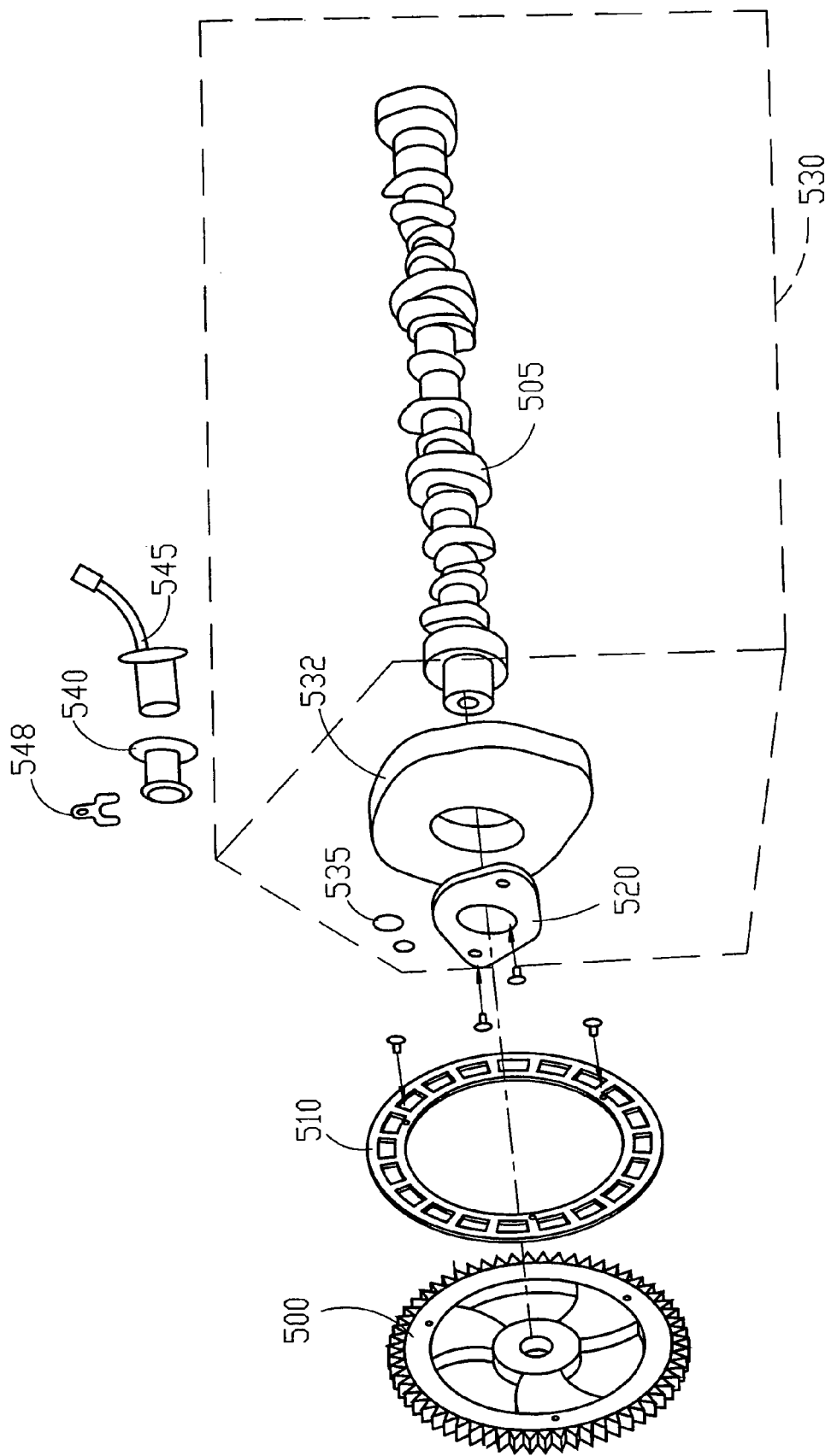
FIG. 7A is an exploded view of the timing mask of the present invention showing its location between the cam shaft and the timing gear.

As illustrated in FIG. 7A, the timing gear (500) is modified to accept a timing mask (510). The timing mask (510) can be made of any suitable material, and is preferably comprised of stainless steel. A non-magnetic plate (520) is positioned between the timing mask (510) and the front plate (532) of the block (530).

A hole (535) is also drilled in the front plate (532) of the engine block (530). An adaptor (540) is positioned inside a hole on the front plate. The adaptor (540) is comprised of a non-metallic metal and is fitted into hole via a hold-down bracket (548) which is in turn secured by a bolt that is threaded through threaded hole in the front plate. The bracket (548) is U-shaped bracket and straddles the adaptor. Preferably, the bracket is comprised of steel. Due to a machined ridge on the outside of the adaptor, the bracket (548) holds the adaptor (540) in place in the front plate when the attaching bolt is tightened. The adaptor (540) receives a hall effect timing pick-up (545) well known to those skilled in the art which is connected to an electronic control unit (not shown) which monitors and controls the timing.

The timing mask (510) can be modified to fit the timing gear (500) utilized by the particular diesel engine that is being converted to a natural gas engine. An example of a timing mask (510) that can be utilized in conjunction with the Navistar 466 engine is shown in FIG. 7B. Timing mask (510) includes a plurality of cut-outs (512) for interacting with the hall-effect timing pick-up (545), one or more holes (514) that are used to fasten the timing mask (510) to the timing gear (500) using bolts and the like, and one or more access holes (516) that enable the timing gear (510) to be connected to the cam shaft (505) in a more accessible manner.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A method of converting a diesel engine to a natural gas engine characterized by an intake manifold, a cylinder head having one or more injector openings which receive a fuel injector, and one or more pistons in corresponding cylinders, said method comprising:
   removing said fuel injectors from said openings;
   inserting a spark plug into each of said openings;
   installing a throttle body adaptor on said intake manifold;
   installing a throttle body on said adaptor, said throttle body having a throttle plate which responds to actuation of an accelerator pedal and opens to allow more air/fuel into the intake manifold;
   modifying said pistons to decrease the compression ratio in said cylinders during operation of said engine; and
   modifying said pistons to have a three-ring or four-ring piston assembly;
   and wherein said throttle body adaptor further comprises a flange and a hose, said hose engaging said flange and engaging said intake manifold.

2. A method of converting a diesel engine to a natural gas engine characterized by an intake manifold, a cylinder head having one or more injector openings which receive a fuel injector, and one or more pistons in corresponding cylinders, said method comprising:
   removing said fuel injectors from said openings;
   inserting a spark plug into each of said openings;
   installing a throttle body adaptor on said intake manifold;
   installing a throttle body on said adaptor, said throttle body having a throttle plate which responds to actuation of an accelerator pedal and opens to allow more air/fuel into the intake manifold;
   modifying said pistons to decrease the compression ratio in said cylinders during operation of said engine; and
   modifying said pistons to have a three-ring or four-ring piston assembly; and
   installing a waste gate and a waste gate adaptor on said diesel engine, said waste gate adaptor enabling a turbocharger to communicate with an exhaust manifold on said engine through said adaptor; wherein said waste gate adaptor has an orifice for connection to said waste gate and also has holes aligned with the exhaust manifold and turbocharger.

* * * * *